US008358837B2

(12) United States Patent
Shakya et al.

(10) Patent No.: US 8,358,837 B2
(45) Date of Patent: Jan. 22, 2013

(54) APPARATUS AND METHODS FOR DETECTING ADULT VIDEOS

(75) Inventors: Subodh Shakya, San Jose, CA (US); Ruofei Zhang, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1301 days.

(21) Appl. No.: 12/113,835

(22) Filed: May 1, 2008

(65) Prior Publication Data

US 2009/0274364 A1    Nov. 5, 2009

(51) Int. Cl.
*G06K 9/00* (2006.01)
*G06K 9/34* (2006.01)

(52) U.S. Cl. ........................................ 382/165; 382/155

(58) Field of Classification Search .................. 382/155, 382/165, 170, 190, 260–264; 707/4, 5, 9, 707/10; 709/206, 217, 218, 219, 225; 715/208, 715/271; 726/1, 22
See application file for complete search history.

(56) References Cited

U.S. PATENT DOCUMENTS

| | | | | |
|---|---|---|---|---|
| 5,796,948 | A * | 8/1998 | Cohen | 709/206 |
| 5,835,722 | A * | 11/1998 | Bradshaw et al. | 709/225 |
| 6,266,664 | B1 * | 7/2001 | Russell-Falla et al. | 707/700 |
| 7,076,527 | B2 * | 7/2006 | Bellegarda et al. | 709/206 |
| 7,689,913 | B2 * | 3/2010 | Umbreit | 715/271 |
| 7,814,545 | B2 * | 10/2010 | Oliver et al. | 726/22 |
| 2008/0134282 | A1 * | 6/2008 | Fridman et al. | 726/1 |
| 2008/0159624 | A1 * | 7/2008 | Sathish et al. | 382/170 |
| 2009/0274364 | A1 * | 11/2009 | Shakya et al. | 382/165 |

OTHER PUBLICATIONS

Marti A. Hearst, "Support Vector Machines" IEEE Intelligent Systems, Jul./Aug. 1998, pp. 18-28.
Yahoo! Search Preferences, Search Preferences, http://search.yahoo.com/preferences/preferences?page=filters&pref_done=http%3A%2F%, printed Apr. 18, 2008.
Yahoo! Advanced Video Search, Advanced Video Search, http://video.search.yahoo.com/video/advanced?ei=UTF-8, printed Apr. 18, 2008.
Google Preferences, http://www.google.com/preferences?hl=en, printed Apr. 18, 2008.
Ron Meir, "Support Vector Machines—an Introduction" Department of Electrical Engineering Technion, Israel, Jun. 2002, pp. 1-44.
Henry A. Rowley et al., "Neural Network—Based Face Detention" PAMI, Jan. 1998, pp. 1-28.

(Continued)

*Primary Examiner* — Amir Alavi
(74) *Attorney, Agent, or Firm* — Weaver Austin Villeneuve & Sampson LLP (57) ABSTRACT

Disclosed are apparatus and methods for detecting whether a video is adult or non-adult. In certain embodiments, a learning system is operable to generate one or more models for adult video detection. The model is generated based on a large set of known videos that have been defined as adult or non-adult. Adult detection is then based on this adult detection model. This adult detection model may be applied to selected key frames of an unknown video. In certain implementations, these key frames can be selected from the frames of the unknown video. Each key frame may generally correspond to a frame that contains key portions that are likely relevant for detecting pornographic or adult aspects of the unknown video. By way of examples, key frames may include moving objects, skin, people, etc. In alternative embodiments, a video is not divided into key frames and all frames are analyzed by a learning system to generate a model, as well as by an adult detection system based on such model.

30 Claims, 8 Drawing Sheets

OTHER PUBLICATIONS

Boon-Lock Yeo et al.,"Rapid Scene Analysis on Compressed Video", IEEE Transactions on Circuits and Systems for Video Technology, vol. 5, No. 6, Dec. 1995, pp. 533-544.

Michael J. Jones et al., "Statistical Color Models with Application to Skin Detection" Compaq Computer Corporation, Cambridge Research Laboratory Technical Report Series, Dec. 1998, pp. 1-28.

Yueting Zhuang et al., Adaptive Key Frame Extraction Using Unsupervised Clustering, Department of Computer Science, Zhejiang University, Beckman Institute Computer Science, University of Illinois, 2000.

Frederic Dufaux, "Key Frame Selection to represent a video" Proceeding 2000 International Conference on Image Processing, Sep. 10-13, 2000, pp. 275-278.

* cited by examiner

APPARATUS AND METHODS FOR DETECTING ADULT VIDEOS

BACKGROUND OF THE INVENTION

The present invention is related to analyzing video content. It especially pertains to analyzing video content to determine whether such video is pornographic.

In multimedia applications, a user may wish to view one or more videos that have an unknown content. In a search application example, a user may search for videos related to a keyword. Some of the videos that are found based on the keyword may be pornographic in nature, and the user may not wish to inadvertently view such pornographic or adult videos. Additionally, adult video content may be inappropriate for people under 18 years of age and it would be beneficial to screen adult video content from reaching users who are minors.

Accordingly, it would be beneficial to provide mechanisms for detecting whether a video is an adult video or is suspected of being an adult video.

SUMMARY OF THE INVENTION

Accordingly, apparatus and methods for detecting whether a video is adult or non-adult are provided. In certain embodiments, a learning system is operable to generate one or more models for adult video detection. The model is generated based on a large set of known videos that have been defined as adult or non-adult. Adult detection is then based on this adult detection model. This adult detection model may be applied to selected key frames of an unknown video. In certain implementations, these key frames can be selected from the frames of the unknown video. Each key frame may generally correspond to a frame that contains key portions that are likely relevant for detecting pornographic or adult aspects of the unknown video. By way of examples, key frames may include moving objects, skin, people, etc. In alternative embodiments, a video is not divided into key frames and all frames are analyzed by a learning system to generate a model, as well as by an adult detection system based on such model.

In one embodiment, a method for detecting pornographic or adult videos is disclosed. For an unknown video having a plurality of frames, a plurality of key frames selected from the frames of the unknown video is defined. Each key frame corresponds to a frame that contains features that are likely relevant for detecting pornographic or adult aspects of the unknown video. The key frames are analyzed using an adult detection model that was generated by a learning process based on a training set of images and their associated adult indicators that each specifies whether the associated known image is an adult or non-adult image, whereby the analysis results in an adult indicator that specifies whether the unknown video is an adult video, a non-adult video, or a suspected adult video.

In a specific implementation, defining the key frames comprises (i) determining one or more portions of each frame that are significantly different from corresponding portions of a plurality of adjacent frames and (ii) defining the key frames based on the significantly different one or more portions of each frame. In a further aspect, analyzing the key frames comprises (i) analyzing one or more of the significantly different portions of each key frame with the adult detection model to thereby determine an adult indicator for such one or more of the significantly different portions of such each key frame being adult or non-adult, and (ii) determining the adult indicator of the unknown video based on the adult indicators for the key frames. In yet a further aspect, an adult indicator is determined for each significantly different portion of each key frame that is determined to include a moving object.

In another implementation, prior to analyzing the key frames of the unknown video, the learning process is executed based on one or more key frame features extracted from each known image and the each known image's associated adult indicator so as to generate the adult detection model that is to be used for the unknown video. In a further aspect, a plurality of key frame features is extracted from the key frames of the unknown video. The analyzing of the key frames of the unknown video is based on the extracted key frame features for such unknown video, and a same type of features are used for analysis of the key frames of the unknown video and by the learning process. In another example, after analyzing the key frames of the unknown video so that the unknown video is defined as a new known video, the key frames and associated adult indicators are included in the training set of known images, and the learning process is executed based on each known image, including the key frames, and each known image's adult indicator, including the key frames' adult indicators, so as to generate a new adult detection model to be used for adult detection of new unknown videos. In one embodiment, one or more adult indicators of the known images, which include the key frames of the new known video, are manually corrected prior to executing the learning process on such known images.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In certain embodiments, pornographic or adult videos are detected from a set of unknown videos, such as the results obtained by a search service. An adult video may have content that would be deemed by a particular community or societal construct to be suitable only for adults, e.g., over 17 or 18, to view. That is, the definition of an "adult" or "pornographic" video is subjective and depends on the specific requirements or social norms of a group of people, cultural, government, or company. Additionally, some societies or communities may have different age thresholds for which it is deemed suitable for viewing or not viewing adult videos.

In certain embodiments, adult detection is based on an adult detection model that is generated from a learning process that analyzes a large set of known videos that have been defined as adult or non-adult. This adult detection model may be applied to selected key frames of an unknown video. In certain implementations, these key frames can be selected from the frames of the unknown video. Each key frame may generally correspond to a frame that contains key portions that are likely relevant for detecting pornographic or adult aspects of the unknown video. By way of examples, key frames may include moving objects, skin, people, etc. In alternative embodiments, a video is not divided into key frames and all frames are analyzed by a learning system to generate a model, as well as by an adult detection system based on such model.

Such adult detection may have any number of uses. For example, detected adult videos may be filtered from search results that are presented to certain users, e.g., who select filtering or are minors. Although several example embodiments of an adult detection technique will now be described with respect to a search application, of course, the adult detection techniques of the present invention can be applied to a diverse number and/or type of applications that could utilize an adult detection process. Examples of other applications include techniques for selecting or displaying advertisements over a computer, mobile phone, or TV network, recommending content to users, or selecting content to be delivered to the user, etc. In general, the inventive method embodiments are applicable in any application that provides video content.

Figure 1:
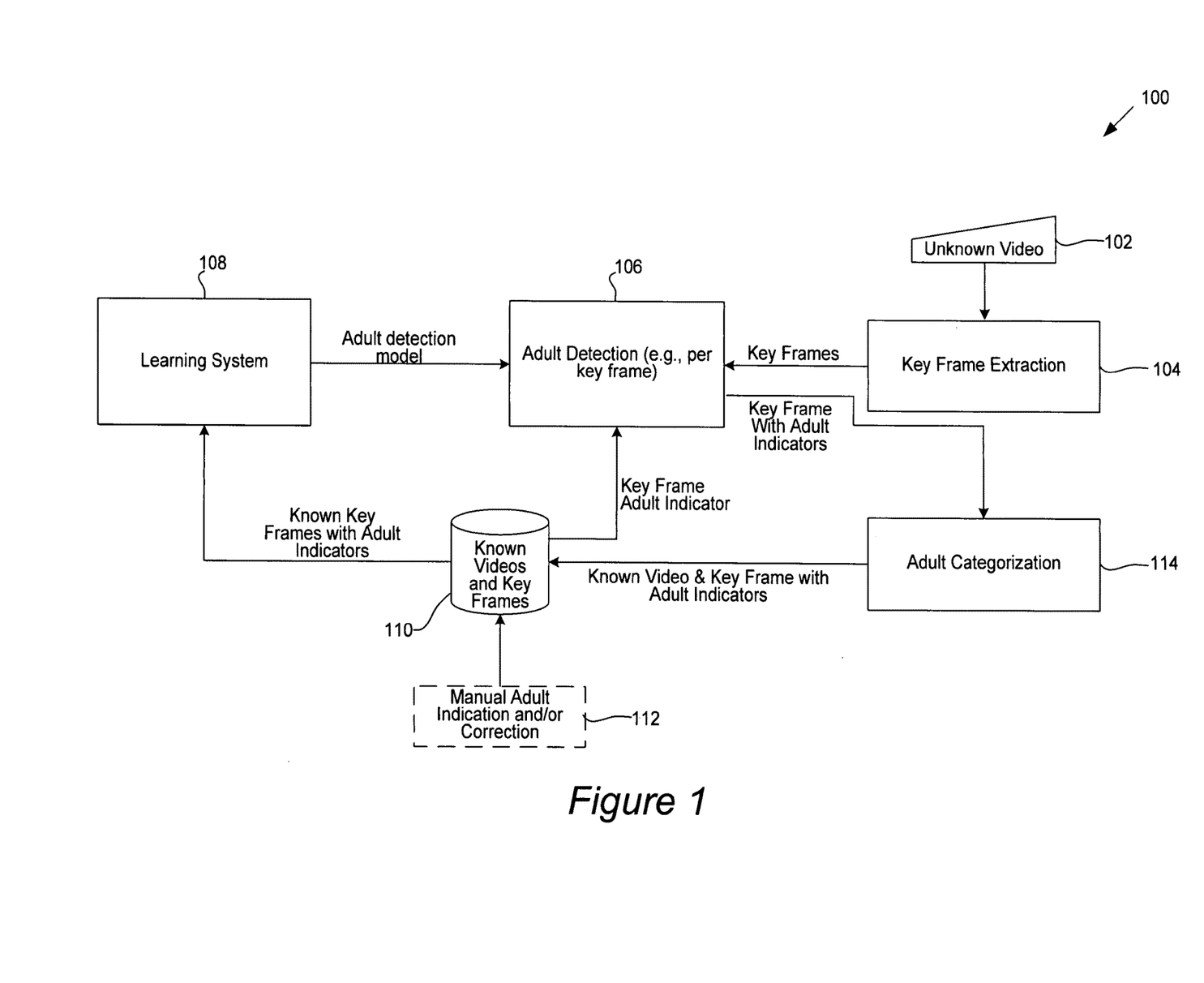
FIG. 1 is a diagrammatic representation of an adult detection system for unknown videos in accordance with one embodiment of the present invention.

FIG. 1 is a diagrammatic representation of an adult detection system 100 for unknown videos in accordance with one embodiment of the present invention. The term "unknown" video is not meant to imply that the unknown video cannot include a tag indicating whether it is an adult video. Said in another way, the adult detection techniques described herein can be implemented independently of the video's self-labeling as to adult content. Accordingly, these adult detection techniques do not need to rely on the tagging or ratings of each video, which may be untrustworthy or incorrect. For example, adult labels or tags may be applied to videos based on inconsistent standards or policy that may be more or less stringent than desired by the users of such adult detection system.

As shown, the adult detection system 100 may include a learning system 108 for generating an adult detection model, an adult detection module 106 for adult detection (e.g., for a particular key frame) based on such model, a key frame extraction module 104 for extracting key frames from an unknown video, and an adult categorization module 114 for categorizing the unknown video based on the adult detection output for the key frames of such unknown video.

Key frame extraction module 102 may receive an unknown video, e.g., that has not yet been analyzed by adult detection module 106. The key frame extraction module generally defines a set of key frames for the unknown videos that can be usefully analyzed by adult detection module 106. In this implementation, the adult detection module 106 receives each key frame and outputs an adult indicator for each key frame to adult categorization module 114. The adult indicator for a particular image indicates whether one or more portions of such image are adult or non-adult, and may also indicate a confidence value for such adult or non-adult indication. The adult indicator may be determined based on either an adult detection model from learning system 108 or may be retrieved from known videos and key frames database 110.

The adult categorization system 114 receives the key frames and their adult indicators for an unknown video and then determines whether the video is an adult video, a non-adult video, or a suspected adult video based on the received key frame adult indicators. The newly known video and its associated adult indicator may be retained in database 110. The adult categorization system 114 may also reassess the key frames and modify their associated adult indicators based on the video's overall adult indicator, as explained further herein. The adult categorization system 114 may also retain these newly known key frame adult indicators, e.g., in database 110.

The learning system 108 may be configured to receive information regarding a large training set of known videos and images and then generate an adult detection model based on this training set that is output to adult detection module 106. The training set of images may be obtained from any suitable storage device or devices, such as from a known videos and key frames database 110. The known video and key frames database 110 may include identifying information for a plurality of known images (or the images themselves) and an adult indicator associated with each image that specifies whether the image is an adult or non-adult image, as well as identifying information for each known video. This training set may initially be provided by manually classifying a large set of images as adult or non-adult. In one embodiment, 6000 or more images (3000 adult and 3000 non-adult) are initially, manually classified as adult or non-adult so as to achieve a reasonable level of accuracy for the adult detection model.

The training set of images may also include images that have been analyzed by the adult detection system 106 based on a previously generated model. For instance, a new model may be generated once a month or every week. That is, a feedback mechanism may be provided so that a new adult detection model is generated periodically based on newly analyzed key frames. The system 100 may also include a manual adult indication and/or correction module 112. This manual module 112 may be include mechanisms to allow a user to manually provide or correct an adult indicator for any number of images or key frames, e.g., of known videos and key frames database 110. In other words, the manual module may allow a user to provide the initial training set and/or to correct adult indicators that are determined by the adult detection system 106. For example, the manual module may include a user interface for viewing images and inputting an adult indicator value (e.g., adult or non-adult) by any suitable input mechanisms, such as a pull-down menu with selectable adult and non-adult options, selectable adult and non-adult buttons, or a text input box into which a user can enter a string indicating "adult" or "non-adult" by way of examples.

Figure 2A:
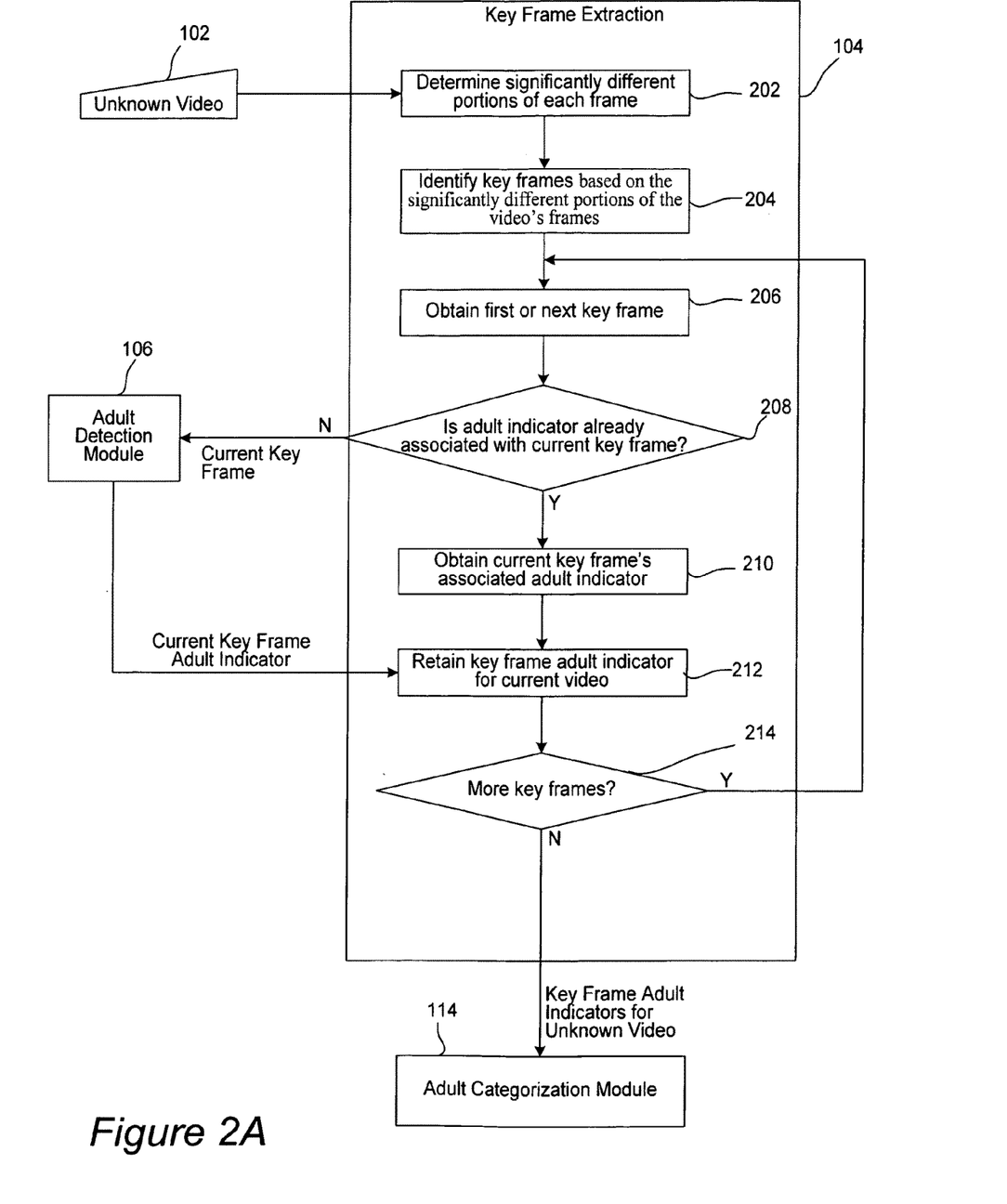
FIG. 2A is a flowchart illustrating processes for adult video detection in accordance with one implementation of the present invention.

FIG. 2A is a flowchart illustrating processes for adult video detection in accordance with one implementation of the present invention. Initially, unknown video 102 may be received into the key frame extraction module 104. An unknown video may originate from any suitable source. Although only described with respect to a single unknown video, the following operations may be performed for each unknown video in a set of unknown videos. In one example, the unknown video is one of the search results that were obtained for a particular user video search, and adult detection may be performed on each of the search results that have not been previously analyzed for adult content.

In one search application, the adult detection system may be configured on or accessible by a search server. The search server may take any suitable form for performing searches for videos. Embodiments of the present invention may be employed with respect to any search application, and example search applications include Yahoo! Search, Google, Microsoft MSN and Live Search, Ask Jeeves, etc. The search application may be implemented on any number of servers.

Figure 2B:
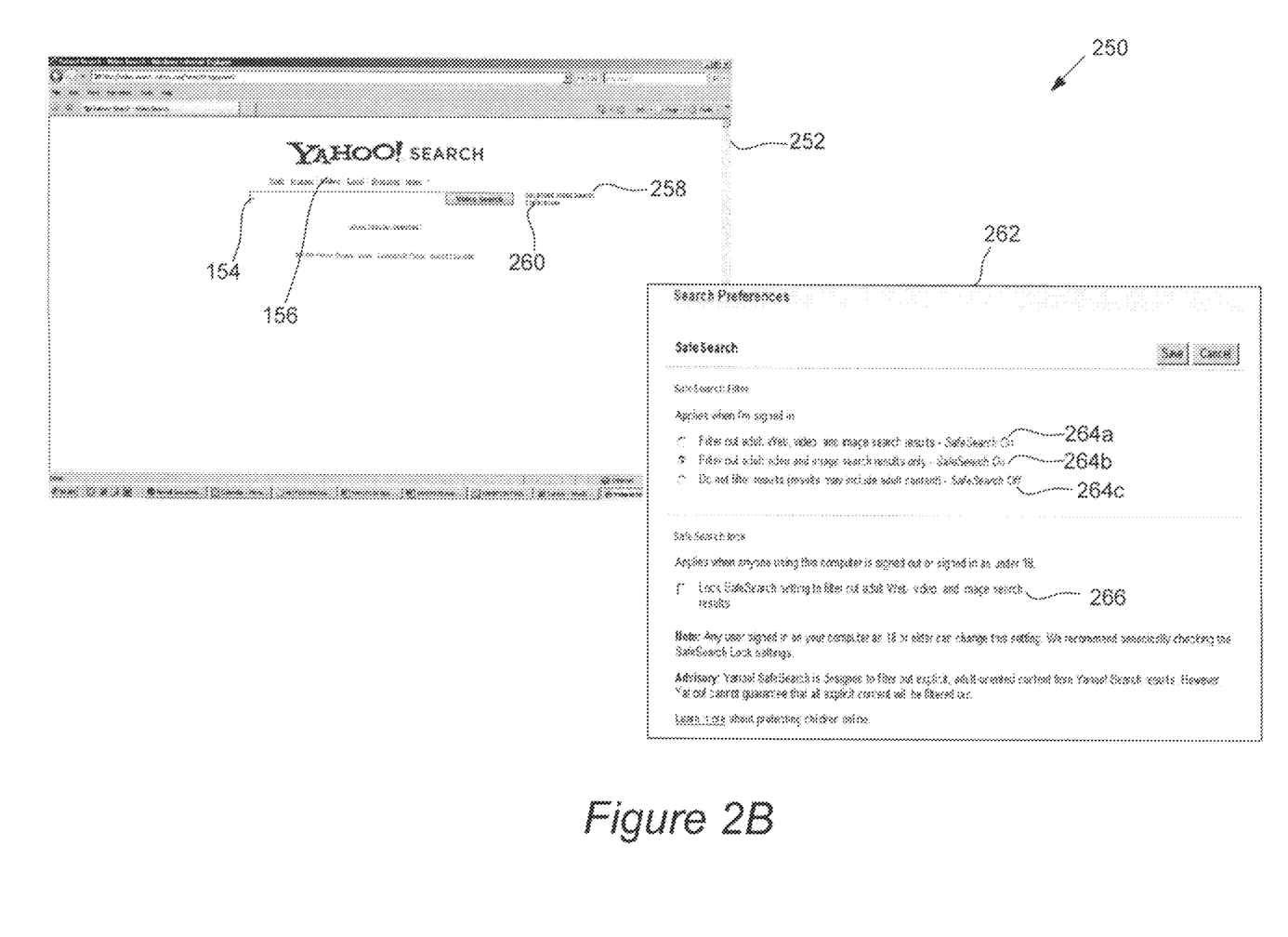
FIG. 2B includes two screen shots from an example search application in which a user may select to filter adult videos from their search results in accordance with a specific implementation.

FIG. 2B includes two screen shots from an example search application 250, e.g., from Yahoo! of Sunnyvale, Calif. In this example, the search application of a search server may present a web page 252 having an input feature in the form of input box 154 to the client so the client can enter one or more search term(s). In a typical implementation, user may type any number of search terms into the search input feature. Selectable options for choosing different types of searches, such as video or images, may also be present next to the input feature. As shown, a user may select a video option 156 for searching videos.

When a search for videos based on one or more search terms is initiated in a query to a search server, the search server then locates a plurality of videos that relate to the search terms. These videos can be found on any number of web servers and usually enter the search server via a crawling and indexing pipeline possibly performed by a different set of computers (not shown). The plurality of located videos may then be analyzed by a rule based or decision tree system to determine a "goodness" or relevance ranking. For instance, the videos are ranked in order from most relevant to least relevant based on a plurality of feature values of the videos, the user who initiated the search with a search request, etc.

At this point, adult video detection may be implemented so as to filter out adult videos from the search results. The adult detection may be selected by the user, e.g., via a selectable search option or via a user profile that was previously set up by the user. The adult detection may also be automatically performed based on the user's age, e.g., when the user is younger than 18 or 17 years old. In FIG. 2B, a user may select an "Advanced Video Search" option 258 to be applied to the current video search, or modify their user preferences 260 for all video searches performed by the user. In this example, the user preferences are only applied when the user is logged in during performance of a search. Other mechanisms may be utilized to detect the user's preference, besides a login, so as to apply adult video detection for such user.

Screen shot 262 includes option 264*a* for "Filtering out adult Web, video, and image search results", option 264*b* for "Filtering out adult video and image search results only", and option 264*c* for "Do not filter results". The user preferences may also be applied more generally to the computer on which the preferences are being set. As shown, the user may select option 266 so as to "Lock safe search setting to filter out adult web, video, and image search results" for anyone signed in to the computer who is under 18 or when searches are performed without logging into the computer.

Once the videos are ranked and filtered, the ranked and filtered lists of documents/objects can then be presented to the user in a search results list that is ordered based on ranking. The ranking and/or adult detection processes may be performed by the search server that has received the search query or by another server, such as a specially configured ranking server (not shown).

Referring back to the key frame extraction process, significantly different portions of each frame of the unknown video 102 may be determined in operation 202. That is, each particular frame is analyzed to determined portions of the particular frame that are significantly different from corresponding portions of a specified number of adjacent frames may be defined for further analysis while background portions are excluded from such analysis. This process generally serves to filter out large portions of the background or noise from each frame while retaining the moving portions of each frame. In one implementation, each frame is compared to a predefined number of adjacent frames to detect difference portions of the each frame that differ from the corresponding adjacent frame portions. Any suitable number of adjacent frames, such as 96 adjacent frames, may be utilized.

Significantly different portions may be found for each frame using any suitable compression technique for removing pixels that are common between a majority of a predefined set of adjacent frames. For example, any suitable video compression approach, such as a MPEG (Moving Picture Experts Group) technique, may be used. In a specific implementation, a modified version of a video compression approach may be used so as to define or detect motion (e.g., moving objects) out of a background and also identify separately each moving object. A simple motion detection approach would be to compare the current frame with the previous frame (which is what is widely used in video compression techniques). However, unlike a video compression technique, the background (or the starting frame) is not constant, e.g., does not rely on a single beginning frame as a reference. In contrast, the reference or background frame actually changes in the direction of the subsequent frames. That is, changes may be tracked, and these tracked changes may be relative to multiple previous frames, not just the beginning frame of a video.

In one example, an original frame, Fo, can first be defined, as well as a next frame, Fn, and a previous frame, Fp, with respect to the current, original frame, Fo. The first step may include finding where the previous frame, Fp, differs from the current (original) frame, Fo. For this purpose, a differencing filter may be applied between the gray scale images obtained from Fp and Fo using a predefined threshold, such as 15%. The result from this difference filter may be an image with white pixels at specific areas for which the current (original)

frame is different from the previous (background) frame by an amount that is equal or above the predefined threshold, e.g., 15%. These specific areas can then be used to count the number of pixels that have actually changed between each pair of frames within a predefined subset of frames, e.g., frames F1-F96. This comparison can now be made with color information. If the difference in pixels between any two of these frames in the predefined subset (e.g., F1-F96) exceeds a predetermined amount, e.g., 35%, a new previous/background frame (Fp) may be used for the original frame, Fo, and the above described modified process is then repeated using the new previous frame, Fp. When the difference in pixels between each of the pairs of frames in the predefined set, e.g., frames F1-F96, is less than 35%, the background of the new, current, previous frame, Fp, may then be subtracted from the current, original frame, Fo, to obtain the significantly different portions of such current frame, Fo. This modified process can be repeated for each frame of the video being defined as the current frame, Fo, as well as new previous frames for such new current frame.

This modified compression process has several features. Since most videos have grainy images that may be interpreted as motion, an erosion technique may be applied before the differencing operations so as to prevent random motion bits from manifesting. Additionally, the previous frame may not actually be the literal previous frame. The previous frame may actually be closely behind the current frame or may be up to 96 frames behind the current frame, depending on the difference in the number of pixels that have been found to have changed. Sometimes the previous frame may just be 3 or 4 frames behind (for example for a fast moving video). Whenever multiple moving objects are detected (identified by multiple closed boundaries that represent separate areas within the white (differenced) image, sudden disappearance of such objects would tend to cause the background/previous frame reference to be reset (to a different previous frame).

Figure 4:
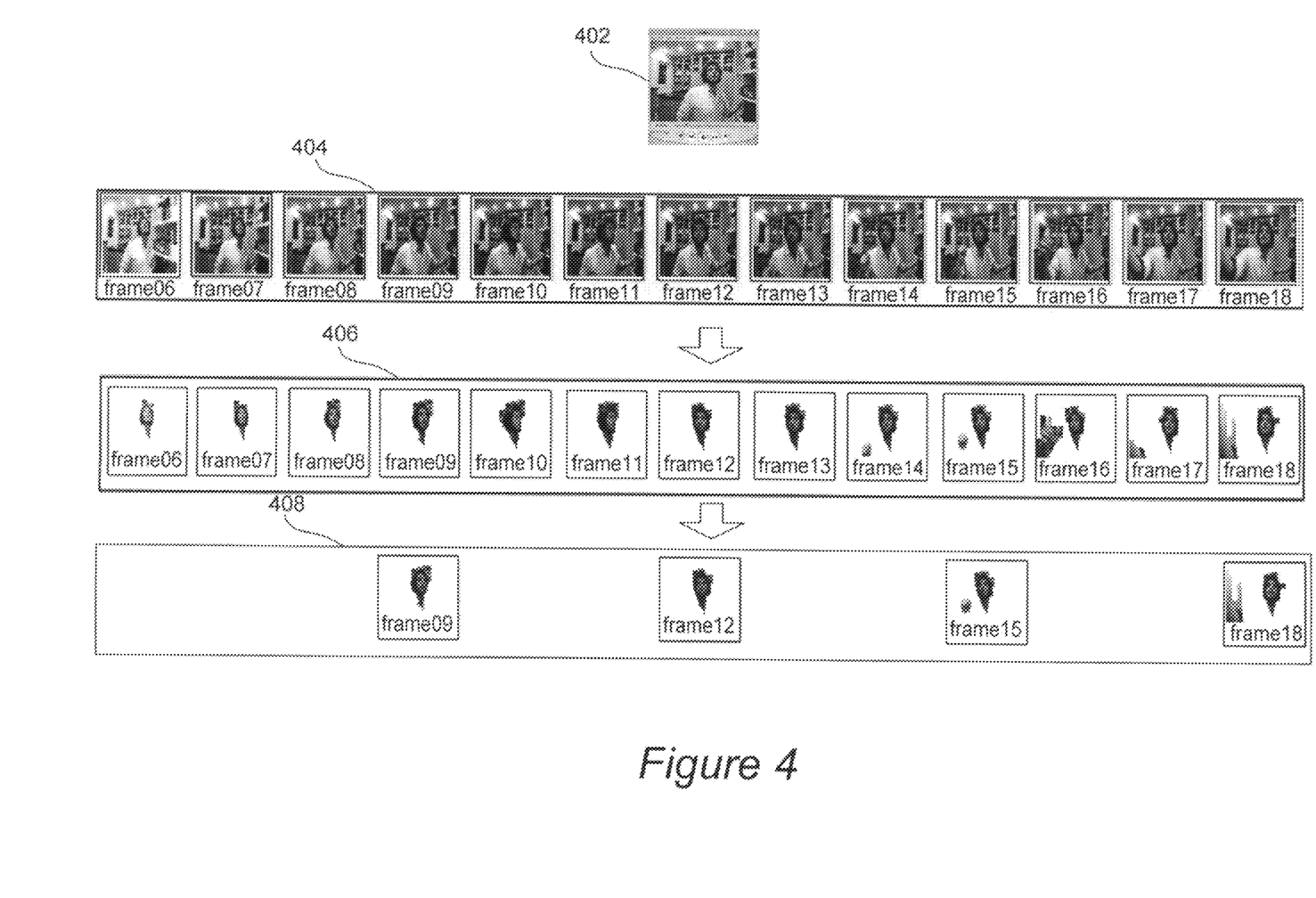
FIG. 4 is a diagrammatic representation of applying key frames detection to an unknown video in accordance with one embodiment of the present invention.

An example application of difference detection is illustrated in FIG. 4. As shown, video 402 includes a plurality of frames 404 (e.g., frames 06 through 18 are shown). When difference detection is applied, the background is substantially filtered out of the frames to produce significantly difference portions for frames 406. A portion of the background may be retained around each significantly different portion (or moving object) to provide context to the further analysis procedures.

Key frames may then be identified or defined based on the significantly different portions of the video's frames in operation 204. By way of example, a full speed, 29 frames per second, video may be reduced to a collection of key frames that represent the whole video and include images that are significantly different from each other. For instance, a set of key frames can be selected from the frames and their significantly different portions based on content differential. Content differential factors may include a quantification or qualification of any suitable characteristics. In one implementation, content differential factors may include a quantification or qualification of one or more of the following image characteristics: motion and spatial activity, likeliness that the image contains people, skin-color detection, and/or face detection. In the example of FIG. 4, the significantly different portions of each frame, as shown by 406, are reduced to key frames 408. For instance, frames 09, 12, 15, and 18 of video 402 are selected as key frames 408.

In a specific implementation of key frame detection, the video is initially divided into shots. One or more shots are then selected. One or more key frames are then selected from each selected shot. Shot detection may be based on detecting discontinuities in motion activity and changes in pixel value histogram distribution. Shot and key frame selection may be based on measures of motion activity, spatial activity, skin-color detection, and face detection. Motion activity may be measured by frame difference, and spatial activity may be determined by the entropy of pixel values distribution. Skin-color and face detection may be based on a learning system, such as described in (i) M. J. Jones et al., "Statistical Color Models with Applications to Skin Detection", TR 98-11, CRL, Compaq Computer Corp., December 1998 and (ii) H. A. Rowley et al., "Neural Network-Based Face Detection", IEEE Trans. On PAMI, 20 (1): 23-38, 1998, which documents are incorporated herein by reference. Alternatively, key frame detection may simply be based on measurable features, rather than object detection. For instance, key frame detection may occur without face detection. One key frame detection technique is further described in Frederic Dufaux, "Key frame selection to represent a video", IEEE Proceedings 2000 International Conference on Image Processing, Vol. 11 of III: 275-278, Sep. 10-13, 2000, which document is incorporated herein by reference.

In other embodiments, a video may be first divided into shots. A shot may be defined as a set of frames that are captured from a same perspective. Shot detection may rely on a measure of frame-to-frame change. Several suitable techniques of shot detection are further described in B. L. Yeo et al., "Rapid Scene Analysis on Compressed Video", IEEE Trans. On CSVT, 5 (6): 533-544, 1995, which document is incorporated herein by reference. A key frame is then selected for each shot. For example, the first frame of each shot may be selected. If a shot contains significant changes (e.g., color or motion) occur in a particular shot, multiple key frames may be selected for such shot, e.g., by using a clustering technique. Clustering techniques are described further in Y. Zhuang et al., "Adaptive Key Frame Extraction Using Unsupervised Clustering", Proc. Of. Int. Conf. on Image Proc., Chicago, October 1998, which document is incorporated herein by reference.

Once a set of key frames is detected for the unknown video, each key frame may then be analyzed to determine an adult indicator for each key frame. Referring back to FIG. 2, a first key frame is then obtained in operation 206. It is then determined whether an adult indicator is already associated with the current key frame in operation 208. For instance, the current key frame may have already been processed in another video during the same search, during a previous search, or manually classified as part of the initial training set of videos or as a corrected key frame. In either case, an adult indicator, e.g., an indication as to whether the key frame is adult or non-adult key frame and a confidence value for such indication, may already be associated with the current key frame, e.g., in database 110. If the current key frame is already associated with an adult indicator, this adult indicator is then obtained in operation 210.

If an adult indicator is not already associated with the current key frame, the current key frame is sent to the adult detection module 106, which outputs an adult indicator for the current key frame. Whether the adult indicator for the current key frame is obtained from a database or determined by the adult detection module 106, the adult indicator for the current key frame may be retained in operation 212. For instance, a unique identifier for the current key frame and its associated adult indicator are retained in database 110. A unique identifier may take any suitable form, such as a unique name or reference that is associated with each frame. It may then be determined whether there are more key frames in operation 214. That is, it is determined whether all of the key frames for the unknown video have been processed. If there are more key frames, the next key frame is obtained in operation 206 and operations 208 through 212 are repeated for such next key frame. When there are no more key frames, the key frame adult indicators for the unknown video are sent to the adult categorization module 114, which outputs an adult indicator for the unknown video based on such key frame adult indicators.

Figure 3:
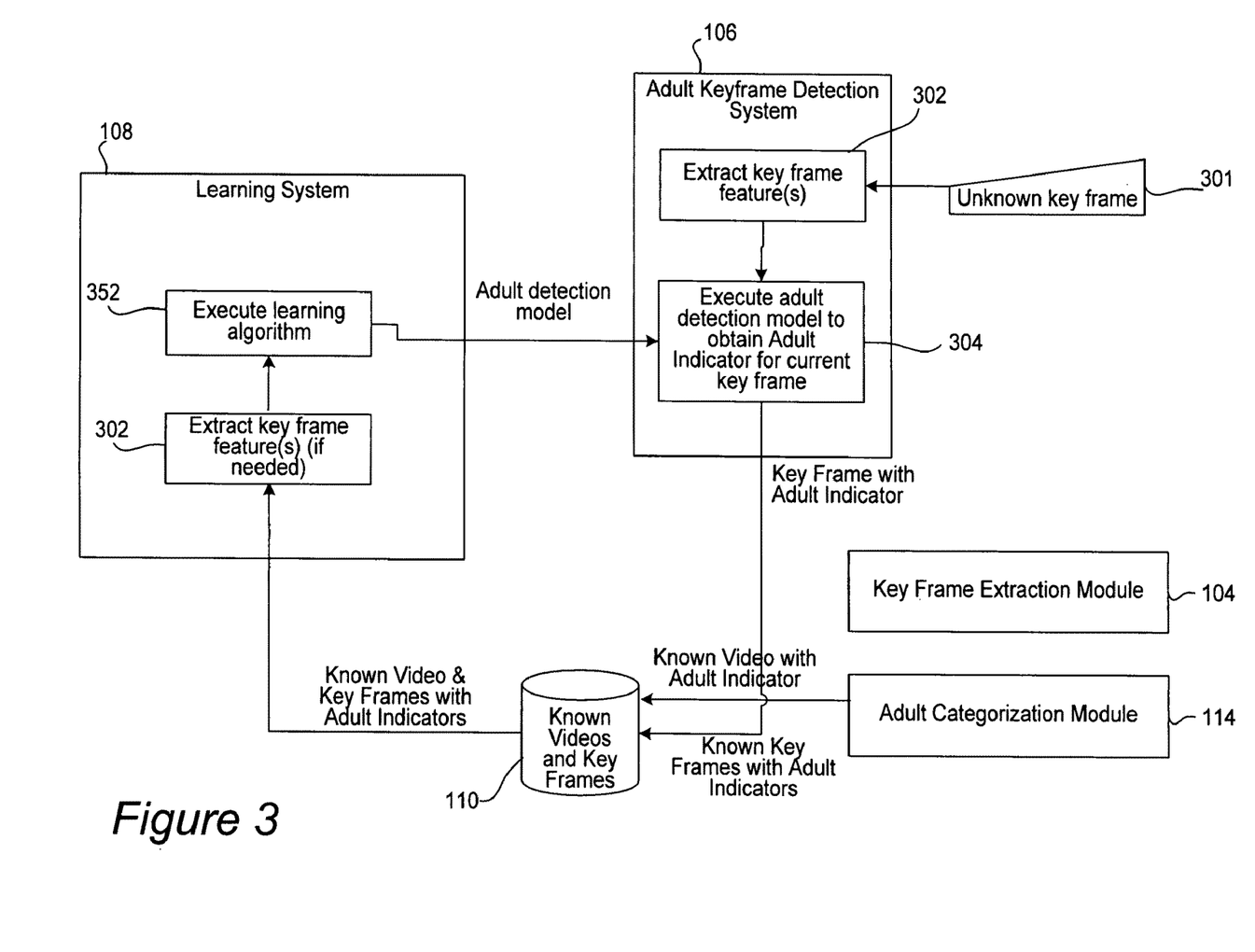
FIG. 3 illustrates example processes for implementation of the learning system and the adult key frame detection system of FIG. 1 in accordance with one embodiment of the present invention.

FIG. 3 illustrates example processes for implementation of the learning system 108 and the adult key frame detection system 106 of FIG. 1 in accordance with one embodiment of the present invention. Before the adult key frame can analyze a key frame to determine an adult indicator, an adult detection model is provided by the learning system 108 to the adult key frame detection module 106.

The learning system may generate an adult detection model utilizing any suitable learning process. The learning system generally may receive information regarding known videos and key frames and their associated adult indicators from database 110. For instance, an index of unique video and key frame identifiers associated with adult indicators and references to the actual videos and key frames may be stored in database 110. The key frames that are associated with the index may be retrieved and analyzed by the learning system 108.

In the illustrated example, one or more key frame features may then be extracted from the known key frames in operation 302. Any suitable key frame features may be extracted from each key frame. In a specific implementation, spatial and/or color distribution features and texture features are extracted. In a further embodiment, audio as well as visual characteristics may also be extracted.

Some techniques that may be used in key feature extraction (or key frame extraction or in any of the frame or video analysis techniques described herein) may include but are not limited to: 1) generating a histogram that counts and graphs the total number of pixels at each grayscale level (e.g., a histogram may be used to detect underexposure or saturation in an image/video), 2) generating a line profile that plots the variations of intensity along a line (e.g., line profiles are sometime helpful in determining the boundaries between objects in an image/video), 3) performing intensity measurements to measure grayscale statistics in an image/video or a region of an image/video, such as but not limited to minimum intensity value, maximum intensity value, mean intensity value, standard deviation of the intensity value, 4) using lookup tables to convert grayscale values in the source image/video into other grayscale values in a transformed image/video, 5) using spatial filters to remove noise, smooth, sharpen or otherwise transform an image/video, such as but not limited to Gaussian filters for smoothing images/video, Laplacian filters for highlighting image/video detail, Median and nth order filters for noise removal and Prewitt, Roberts and Sobel filters for edge detection, 6) using grayscale morphology to filter or smooth the pixel intensities of an image/video, to alter the shape of regions by expanding bright areas at the expense of dark areas, remove or enhance isolated features, smooth gradually varying patterns and increase the contrast in boundary areas, 7) using frequency domain processing to remove unwanted frequency information, such as noise, 8) blob (binary large object) analysis in regards to touching pixels with same logic state (Blob analysis may be used to find statistical information such as the size of blobs or the number, location and presence of blob regions to locate particular objects in an image/video.), 9) using thresholding to select ranges of pixel values in grayscale and color images/video that separate objects under consideration from the background, or 10) using binary morphological operations to extract and/or alter the structures of particles (e.g., blobs) in a binary image/video including primary binary morphology, advanced binary morphology.

Other image processing techniques may include 11) using edge detection algorithms, 12) using gauging of dimensional characteristics of objects, 13) using image correlation to determine how close an image/video is to an expected image/video (e.g., comparing a newly captured image/video to a recorded image/video that has already been analyzed for object identification), 14) using pattern matching to locate regions of a grayscale image/video and determine how close the grayscale image/video matches a predetermined template (e.g., pattern matching may be configured to find template matches regardless of poor lighting, blur, noise, shifting of the template or rotation of the template. For graphical components on a captured image/video, the size, shape, location, etc. that correspond to specific objects in an image/video may be predetermined which allows a template to be constructed for particular object sets), 15) using optical character recognition algorithms and methods, 16) using color matching to quantify which color, how much of each color and/or ratio of colors exist in a region of an image/video and compare the values generated during color matching to expected values to determine whether the image/video includes known reference object colors, and 17) using color pattern matching to locate known reference patterns in a color image/video.

Referring back to FIG. 3 after features are extracted from each known key frame, a learning algorithm may then be executed on the extracted key frame features in operation 352. The learning algorithm outputs an adult detection model to the adult key frame detection system 106.

Any suitable learning system may be utilized. For example, a suitable open source learning algorithm, which is known as the Support Vector Machine, is available through Kernel-Machines.org. Embodiments of the Support Vector Machine are further described in (i) the publication by Ron Meir, "Support Vector Machines—an Introduction", Dept. of Electr. Eng. Technion, Israel, June 2002, (ii) U.S. Pat. No. 7,356,187, issued 8 Apr. 2008 by Shananhan et al., and (iii) U.S. Pat. No. 6,816,847, issued 9 Nov. 2004 by Toyama, which document and patents are incorporated herein by reference in their entirety.

For example, Support Vector Machines may build classifiers by identifying a hyperplane that partitions two classes of adult and non-adult videos or images in a multi-dimensional feature space into two disjoint subsets with a maximum margin, e.g., between the hyperplane and each class. In the linear form of SVM that is employed in one embodiment, the margin is defined by the distance of the hyperplane to the nearest adult and non-adult cases for each class. Different SVM-based training methods include maximizing the margin as an optimization problem.

Mathematically, a linear SVM (e.g., non-linear SVMs are also contemplated) can be represented, for example, in the following two equivalent forms: using a weight vector representation; or using a support vector representation. The weight vector representation mathematically can represent an SVM (the separating hyperplane) as a pair of parameters <W, b>, where W denotes a weight vector and b represents a threshold or bias term. The weight vector W can include a list of tuples of the form $<f_i, w_i>$, where $f_i$ denotes a feature and $w_i$ denotes the weight associated with feature $f_i$. This corresponds to a vector space representation of the weight vector W. Here, the weight value $w_i$ associated with each feature $f_i$ and the threshold value b may be learned from examples using standard SVM learning algorithms. This weight vector representation is also known as the primal representation. The support vector representation of an SVM model, also known as the dual representation, mathematically represents an SVM (the separating hyperplane) as a pair of parameters <SV, b>, where SV denotes a list of example tuples, known as support vectors, and b represents a threshold. The support vector list can include tuples of the form <$SV_i$, $α_i$>, where $SV_i$ denotes an example video with known classification and $α_i$ denotes the weight associated with example $SV_i$. The Euclidean (perpendicular) distance from the hyperplane to the support vectors is known as the margin of the support vector machine.

The parameters of the support vector machine model may be determined using a learning algorithm in conjunction with a training data set that characterizes the information need, i.e., a list of videos or key frames that have been labeled as adult or non-adult. Abstractly, learning a linear SVM model may include determining the position and orientation of the hyperplane that separates the adult examples and non-adult examples that are used during learning. The parameters of the weight vector representation or the support vector representation may also be determined. Learning a support vector machine can be viewed both as a constraint satisfaction and optimization algorithm, where the first objective is to determine a hyperplane that classifies each labeled training example correctly, and where the second objective is to determine the hyperplane that is furthest from the training data, so that an adult detection model is determined.

Referring back to FIG. 3, the model that is output from learning system 108 may be used for each unknown video and its unknown key frames. In the illustrated example, an unknown key frame 301 is received by the adult key frame detection system 106. One or more key frame features may then be extracted from such unknown key frame, e.g., as described above for the learning system, in operation 302. The adult detection model may then be executed to obtain an adult indicator for the current key frame in operation 304. The key frame adult indicator may then be output from the adult key frame detection system 106.

Classifying a key frame using an SVM model reduces to determining which side of the hyperplane the example falls. If the example falls on the adult side of the hyperplane then the example is assigned an adult label; otherwise it is assigned a non-adult label. This form of learned SVM is known as a hard SVM. Other types of SVM exist which relax the first objective. For example, not requiring all training examples to be classified correctly by the SVM leads to a type known as soft SVMs. In this case the SVM learning algorithm sacrifices accuracy of the model with the margin of the model. Other types of SVMs and SVM learning algorithms also exist and may be utilized by techniques of the present invention.

Figure 5:
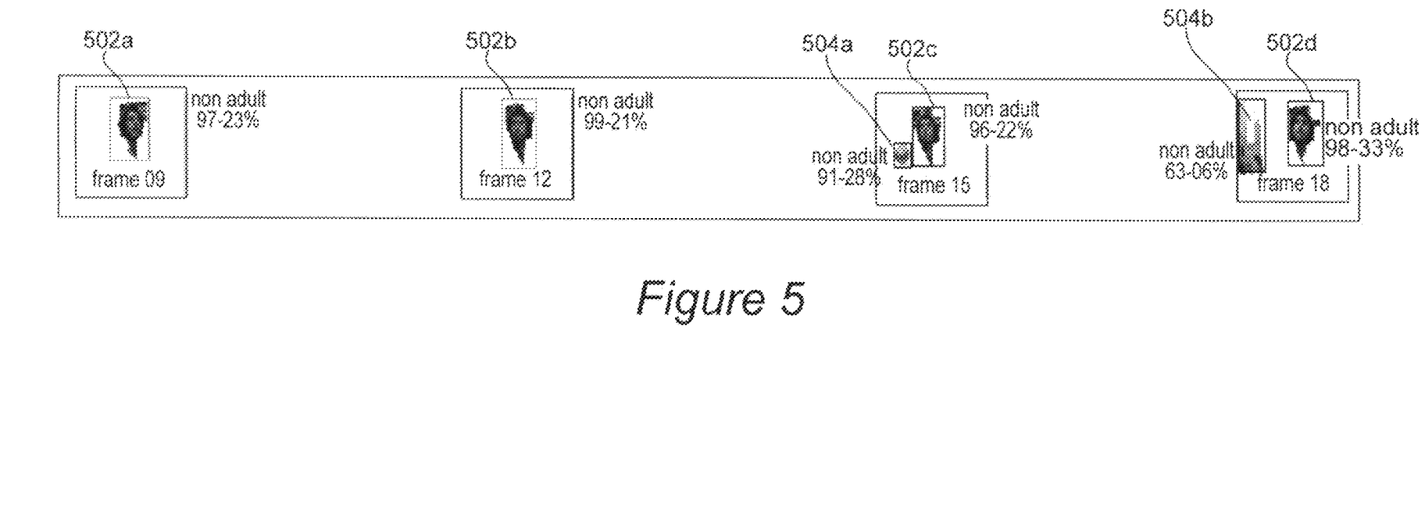
FIG. 5 is a diagrammatic representation of a plurality of key frame adult indicators in accordance with a specific implementation.

Once each key frame of an unknown video has been assigned at least one adult indicator, the adult categorization module may then determine an adult indicator for the entire unknown video based on the key frames' adult indicators. In one embodiment, each significantly different portion of each key frame that is determined to be a moving object is assigned an adult indicator. FIG. 5 is a diagrammatic representation of a plurality of key frame adult indicators in accordance with a specific implementation. As shown, portion 502a of key frame 09 has an adult indicator that specifies "non-adult" and a 97.23% confidence level, and portion 502b of key frame 12 has an adult indicator that specifies "non-adult" and a 99.21%. Key frames 15 and 18 each have two portions that each have a representative adult indicator. Key frame 15 has a portion 504a with an adult indicator of "adult" at a 91.28% confidence level and a portion 502c with an adult indicator of "non-adult" at a 96.22% confidence level. Key frame 19 has a portion 504b with an adult indicator of "adult" at a 63.06% confidence level and a portion 502d with an adult indicator of "non-adult" at a 98.33% confidence level.

Any suitable technique may be used to determine an unknown video's adult indicator based on the key frame adult indicators. In one implementation, an average confidence value is determined for all of the key frames for both adult and non-adult portions. For instance, the confidence level for the video being non-adult may be determined by (97.23+99.21+96.22+98.33)/4, which equals 97.75%. Likewise, the adult confidence level may be determined by (0+0+91.28+63.06)/4, which equals 38.59%. The final determination may be based on different thresholds for adult and non-adult confidence levels. For instance, when the aggregate (total) non-adult confidence level exceeds 97%, the unknown video is deemed to be safe (non-adult), provided that the aggregate adult confidence level is below 50%. In other examples, when the adult confidence is above 70% and the non-adult confidence is below 61%, the unknown video may be deemed adult. Additionally, the unknown video may be deemed a suspected adult video when the adult confidence level is above 70%, while the non-adult confidence level is above 61.11%. Other thresholds that may be used involve non-deterministic scenarios such as an unknown video having too low aggregate confidence scores (for example, less than 70% adult and less than 61% non-adult). Likewise if an unknown video has very high scores (contention) between adult as well as non-adult cut-offs (e.g., 80% adult and 99% non-adult), the unknown video can be deemed as suspect safe.

Once an unknown video's adult indicator is determined, the key frame adult indicators for such now known video can be reassessed. For example, if the video is determined to be adult, all key frames with an adult indicator can have their confidence levels increased. As an example, a Video Va containing key frames K1, K2, K3, and K4 was deemed suspect adult. At a later point when another Video Vb containing key frames K3, K4, K5, and K6 is deemed to be "adult classified," the classification causes the result of Va to be reassessed to the extent that if any of the key frames (e.g., K3 and K4) were contributing non-deterministically earlier by way of mechanics described in above, the aggregate scores may now be recalculated based on the new information. Since Video Vb is adult, non-determinstic key frames belonging to all videos including common with Vb (in Va, for example, K3 and K4) can also be deemed as adult.

Referring back to FIG. 3, when a new known video and its key frames adult indicator determination has been completed, the new known video and key frames with their associated adult indicators may be retained, e.g., in database 110. In one implementation, the database includes a list of a plurality of videos entries that each includes a reference or title and an unique video identity, which can be quickly search for the video's location and/or identity. The database may also include another list of unique video identifiers and their associated one or more key words for such video, a server identity, a video type, the number of key frames, a video confidence value, an adult indicator field (e.g. set to 1 for an adult video and 0 for non-adult or possibly suspected adult), and a suspected adult indicator field (e.g. set to 1 for suspected adult and set to 0 for non-adult video). The database may also include a list of key frames for the multiple videos, where each key frame entry includes a video identifier, key frame identifier or number, key frame file name or reference, type, fingerprint, adult indicator (e.g., adult or non-adult), and a confidence level value. The fingerprint takes the form of a unique identifier for the key frame and helps in locating, searching and comparing key frames quickly.

Figure 6:
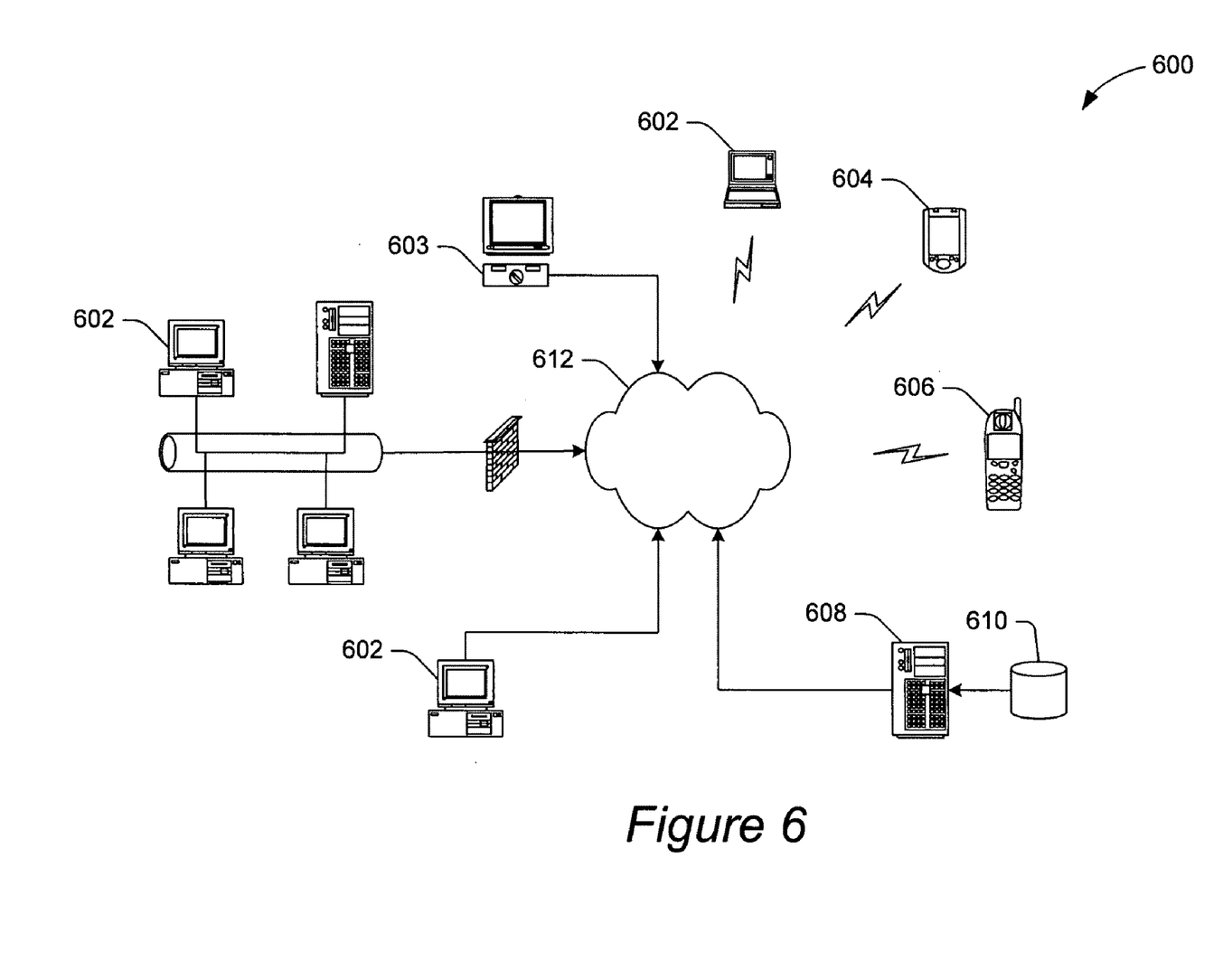
FIG. 6 is a simplified diagram of a network environment in which specific embodiments of the present invention may be implemented.

Embodiments of the present invention may be employed to perform adult detection techniques in any of a wide variety of computing contexts. For example, as illustrated in FIG. 6, implementations are contemplated in which the relevant population of users interact with a diverse network environment via any type of computer (e.g., desktop, laptop, tablet, etc.) 602, media computing platforms 603 (e.g., cable and satellite set top boxes and digital video recorders), handheld computing devices (e.g., PDAs) 604, cell phones 606, or any other type of computing or communication platform.

And according to various embodiments, video information, as well as user preferences, may be obtained using a wide variety of techniques. For example, adult detection selection based on a user's interaction with a local application, web site or web-based application or service may be accomplished using any of a variety of well known mechanisms for recording and determining a user's behavior. However, it should be understood that such methods are merely exemplary and that preference information and video information may be collected in many other ways.

Once video information has been obtained, this information may be analyzed and used to generate adult indicators according to the invention in some centralized manner. This is represented in FIG. 6 by server 608 and data store 610 that, as will be understood, may correspond to multiple distributed devices and data stores. The invention may also be practiced in a wide variety of network environments (represented by network 612) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Figure 7:
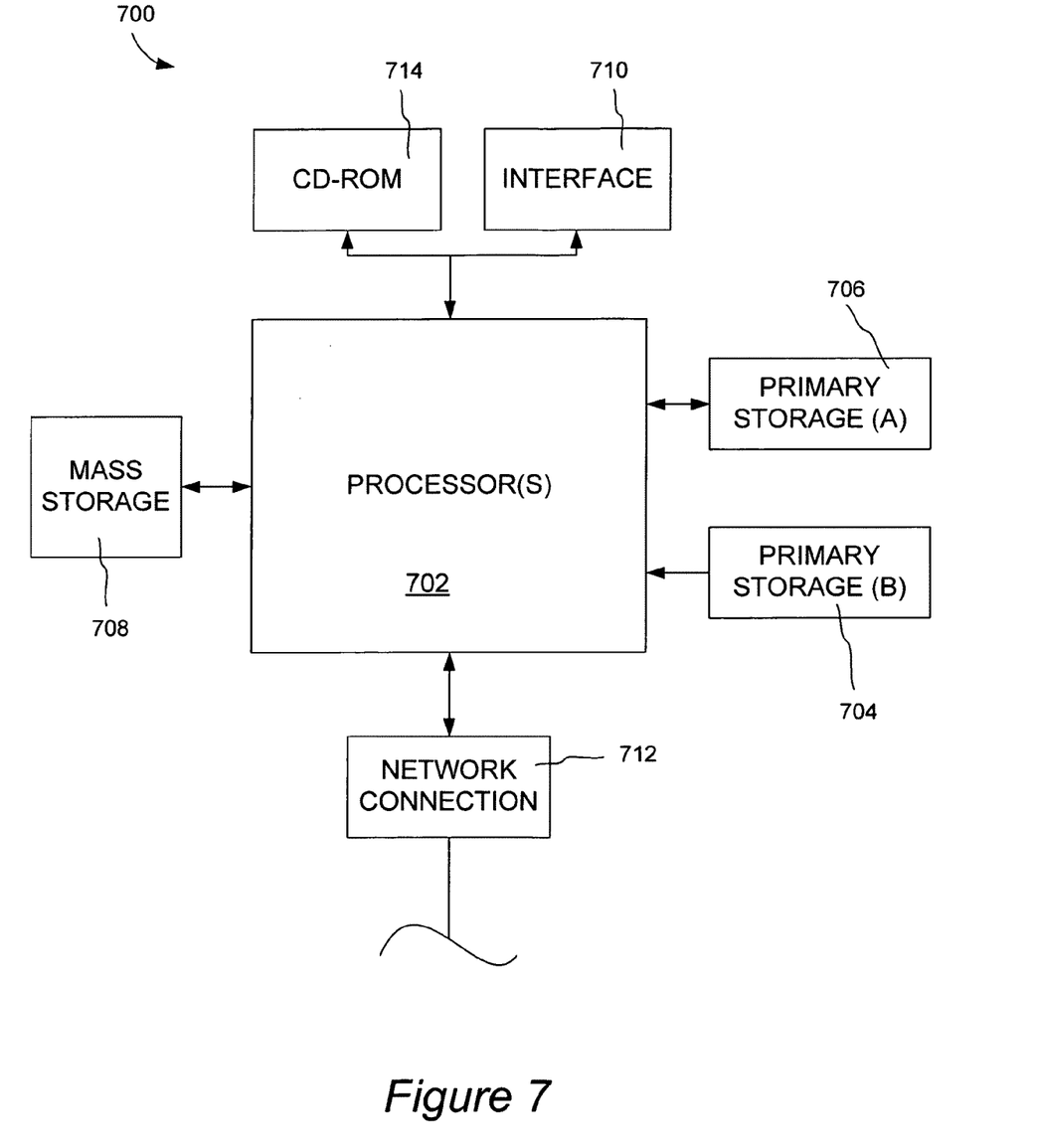
FIG. 7 illustrates an example computer system in which specific embodiments of the present invention may be implemented.

FIG. 7 illustrates a typical computer system that, when appropriately configured or designed, can serve as a adult detection system and/or search application, etc. The computer system 700 includes any number of processors 702 (also referred to as central processing units, or CPUs) that are coupled to storage devices including primary storage 706 (typically a random access memory, or RAM), primary storage 704 (typically a read only memory, or ROM). CPU 702 may be of various types including microcontrollers and microprocessors such as programmable devices (e.g., CPLDs and FPGAs) and unprogrammable devices such as gate array ASICs or general-purpose microprocessors. As is well known in the art, primary storage 704 acts to transfer data and instructions uni-directionally to the CPU and primary storage 706 is used typically to transfer data and instructions in a bi-directional manner. Both of these primary storage devices may include any suitable computer-readable media such as those described herein. A mass storage device 708 is also coupled bi-directionally to CPU 702 and provides additional data storage capacity and may include any of the computer-readable media described above. Mass storage device 708 may be used to store programs, data and the like and is typically a secondary storage medium such as a hard disk. It will be appreciated that the information retained within the mass storage device 708, may, in appropriate cases, be incorporated in standard fashion as part of primary storage 706 as virtual memory. A specific mass storage device such as a CD-ROM 714 may also pass data uni-directionally to the CPU.

CPU 702 is also coupled to an interface 710 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to an external device such as a database or a computer or telecommunications network using an external connection as shown generally at 712. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store user preferences and profile information, video and key frame information, adult detection models adult indicators for key frames and videos, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method for detecting pornographic or adult videos, comprising:
    for an unknown video having a plurality of frames, defining a plurality of key frames selected from the frames of the unknown video, wherein each key frame corresponds to a frame that contains features that are likely relevant for detecting pornographic or adult aspects of the unknown video; and
    analyzing the key frames using an adult detection model that was generated by a learning process based on a training set of images and their associated adult indicators that each specifies whether the associated known image is an adult or non- adult image, whereby the analysis results in an adult indicator that specifies whether the unknown video is an adult video, a non-adult video, or a suspected adult video.

2. The method as recited in claim 1, wherein defining the key frames comprises:
   determining one or more portions of each frame that are significantly different from corresponding portions of a plurality of adjacent frames; and
   defining the key frames based on the significantly different one or more portions of each frame.

3. The method as recited in claim 2, wherein analyzing the key frames comprises:
   analyzing one or more of the significantly different portions of each key frame with the adult detection model to thereby determine an adult indicator for such one or more of the significantly different portions of such each key frame being adult or non- adult; and
   determining the adult indicator of the unknown video based on the adult indicators for the key frames.

4. The method as recited in claim 3, wherein an adult indicator is determined for each significantly different portion of each key frame that is determined to include a moving object.

5. The method as recited in claim 1, further comprising:
   prior to analyzing the key frames of the unknown video, executing the learning process based on one or more key frame features extracted from each known image and the each known image's associated adult indicator so as to generate the adult detection model that is to be used for the unknown video.

6. The method as recited in claim 5, further comprising extracting a plurality of key frame features from the key frames of the unknown video, wherein the analyzing of the key frames of the unknown video is based on the extracted key frame features for such unknown video, and wherein a same type of features are used for analysis of the key frames of the unknown video and by the learning process.

7. The method as recited in claim 5, further comprising:
   after analyzing the key frames of the unknown video so that the unknown video is defined as a new known video, including the key frames and associated adult indicators in the training set of known images; and
   executing the learning process based on each known image, including the key frames, and each known image's adult indicator, including the key frames' adult indicators, so as to generate a new adult detection model to be used for adult detection of new unknown videos.

8. The method as recited in claim 7, further comprising manually correcting one or more adult indicators of the known images, which include the key frames of the new known video, prior to executing the learning process on such known images.

9. The method as recited in claim 1, wherein the adult indicator specifies that the unknown video is an adult video when an adult indicator field is set, and wherein the adult indicator specifies that the unknown video is a suspected adult video when a suspected adult indicator field is set.

10. The method as recited in claim 1, wherein the analysis results in a confidence level corresponding to the adult indicator, wherein the confidence level corresponding to the adult indicator comprises a value within a first range of values when the unknown video is an adult video, wherein the confidence level corresponding to the adult indicator is within a second range of values when the unknown video is a suspected adult video, and wherein the confidence level corresponding to the adult indicator is within a third range of values when the unknown values is a non-adult video.

11. An apparatus comprising at least a processor and a memory, wherein the processor and/or memory are configured to perform operations, comprising:
   for an unknown video having a plurality of frames, defining a plurality of key frames selected from the frames of the unknown video, wherein each key frame corresponds to a frame that contains features that are likely relevant for detecting pornographic or adult aspects of the unknown video; and
   analyzing the key frames using an adult detection model that was generated by a learning process based on a training set of images and their associated adult indicators that each specifies whether the associated known image is an adult or non-adult image, whereby the analysis results in an adult indicator that specifies whether the unknown video is an adult video, a non-adult video, or a suspected adult video.

12. The apparatus as recited in claim 11, wherein defining the key frames comprises:
   determining one or more portions of each frame that are significantly different from corresponding portions of a plurality of adjacent frames; and
   defining the key frames based on the significantly different one or more portions of each frame.

13. The apparatus as recited in claim 12, wherein analyzing the key frames comprises:
   analyzing one or more of the significantly different portions of each key frame with the adult detection model to thereby determine an adult indicator for such one or more of the significantly different portions of such each key frame being adult or non- adult; and
   determining the adult indicator of the unknown video based on the adult indicators for the key frames.

14. The apparatus as recited in claim 13, wherein an adult indicator is determined for each significantly different portion of each key frame that is determined to include a moving object.

15. The apparatus as recited in claim 11, wherein the processor and/or memory are
further configured for performing operations, further comprising:
   prior to analyzing the key frames of the unknown video, executing the learning process based on one or more key frame features extracted from each known image and the each known image's associated adult indicator so as to generate the adult detection model that is to be used for the unknown video.

16. The apparatus as recited in claim 15, wherein the processor and/or memory
are further configured for performing operations, further comprising:
   extracting a plurality of key frame features from the key frames of the unknown video, wherein the analyzing of the key frames of the unknown video is based on the extracted key frame features for such unknown video, and wherein a same type of features are used for analysis of the key frames of the unknown video and by the learning process.

17. The apparatus as recited in claim 15, wherein the processor and/or memory are further configured for performing operations, further comprising:

after analyzing the key frames of the unknown video so that the unknown video is defined as a new known video, including the key frames and associated adult indicators in the training set of known images; and executing the learning process based on each known image, including the key frames, and each known image's adult indicator, including the key frames' adult indicators, so as to generate a new adult detection model to be used for adult detection of new unknown videos.

18. The apparatus as recited in claim 17, wherein the processor and/or memory are further configured for supporting manually correcting one or more adult indicators of the known images, which include the key frames of the new known video, prior to executing the learning process on such known images.

19. The apparatus as recited in claim 11, wherein the adult indicator specifies that the unknown video is an adult video when the adult indicator is in a first state, that the unknown video is a non-adult video when the adult indicator is in a second state, or that the unknown video is a suspected adult video when the adult indicator is in a third state.

20. At least one non-transitory computer readable storage medium having computer program instructions stored thereon that are arranged to perform operations, comprising:

for an unknown video having a plurality of frames, defining a plurality of key frames selected from the frames of the unknown video, wherein each key frame corresponds to a frame that contains features that are likely relevant for detecting pornographic or adult aspects of the unknown video; and analyzing the key frames using an adult detection model that was generated by a learning process based on a training set of images and their associated adult indicators that each specifies whether the associated known image is an adult or non- adult image, whereby the analysis results in an adult indicator that specifies whether the unknown video is an adult video, a non-adult video, or a suspected adult video.

21. The at least one non-transitory computer readable storage medium as recited in claim 20, wherein defining the key frames comprises:

determining one or more portions of each frame that are significantly different from corresponding portions of a plurality of adjacent frames; and defining the key frames based on the significantly different one or more portions of each frame.

22. The at least one non-transitory computer readable storage medium as recited in claim 21, wherein analyzing the key frames comprises:

analyzing one or more of the significantly different portions of each key frame with the adult detection model to thereby determine an adult indicator for such one or more of the significantly different portions of such each key frame being adult or non- adult; and determining the adult indicator of the unknown video based on the adult indicators for the key frames.

23. The at least one non-transitory computer readable storage medium as recited in claim 22, wherein an adult indicator is determined for each significantly different portion of each key frame that is determined to include a moving object.

24. The at least one non-transitory computer readable storage medium as recited in claim 20, wherein the computer program instructions are further arranged to perform operations, further comprising:

prior to analyzing the key frames of the unknown video, executing the learning process based on one or more key frame features extracted from each known image and the each known image's associated adult indicator so as to generate the adult detection model that is to be used for the unknown video.

25. The at least one computer readable storage medium as recited in claim 24, wherein the computer program instructions are further arranged to operations, further comprising:

extracting a plurality of key frame features from the key frames of the unknown video, wherein the analyzing of the key frames of the unknown video is based on the extracted key frame features for such unknown video, and wherein a same type of features are used for analysis of the key frames of the unknown video and by the learning process.

26. The at least one non-transitory computer readable storage medium as recited in claim 24, wherein the computer program instructions are further arranged to perform operations, further comprising:

after analyzing the key frames of the unknown video so that the unknown video is defined as a new known video, including the key frames and associated adult indicators in the training set of known images; and executing the learning process based on each known image, including the key frames, and each known image's adult indicator, including the key frames' adult indicators, so as to generate a new adult detection model to be used for adult detection of new unknown videos.

27. The at least one non-transitory computer readable storage medium as recited in claim 26, wherein the computer program instructions are further arranged to perform operations, further comprising:

manually correcting one or more adult indicators of the known images, which include the key frames of the new known video, prior to executing the learning process on such known images.

28. At least one non-transitory computer readable storage medium having computer program instructions stored thereon that are arranged to perform operations, comprising:

sending a request for a plurality of videos, wherein the request is associated with a parameter that indicates that pornographic or adult videos are to be filtered from such videos; and receiving a plurality of references to a plurality of videos from which a plurality of adult videos have been filtered using an adult detection model that was generated by a learning process based on a training set of videos that each include an adult indicator that specifies whether the each known video is an adult video, a non-adult video, or a suspected adult video.

29. An apparatus comprising at least a processor and a memory, wherein the processor and/or memory are configured to perform operations, comprising:

sending a request for a plurality of videos, wherein the request is associated with a parameter that indicates that pornographic or adult videos are to be filtered from such videos; and receiving a plurality of references to a plurality of videos from which a plurality of adult videos have been filtered using an adult detection model that was generated by a learning process based on a training set of videos that each include an adult indicator that specifies that the known video is an adult video when the adult indicator is in a first state, that the known video is a non-adult video when the adult indicator is in a second state, or that the known video is a suspected adult video when the adult indicator is in a third state.

30. At least one non-transitory computer readable storage medium having computer program instructions stored thereon that are arranged to perform operations, comprising:

sending a request for a plurality of videos, wherein the request is associated with a parameter that indicates that pornographic or adult videos are to be filtered from such videos; and receiving a plurality of references to a plurality of videos from which a plurality of adult videos have been filtered using an adult detection model that was generated by a learning process based on a training set of videos that each include an adult indicator that specifies that the known video is an adult video when the adult indicator is in a first state, that the known video is a non-adult video when the adult indicator is in a second state, or that the known video is a suspected adult video when the adult indicator is in a third state.

* * * * *